United States Patent [19]
Dietrich

[11] Patent Number: 6,058,826
[45] Date of Patent: May 9, 2000

[54] POWER STEERING CYLINDER ASSEMBLY

[76] Inventor: Otto E. Dietrich, 911 W. Jefferson P.O. Box 121, Morton, Ill. 61550

[21] Appl. No.: 09/093,458

[22] Filed: Jun. 8, 1998

[51] Int. Cl.[7] .................................................... F15B 13/10
[52] U.S. Cl. .................. 91/438; 60/406; 92/163
[58] Field of Search ..................... 91/437, 438; 60/406; 92/163

[56] References Cited

U.S. PATENT DOCUMENTS

| | | | |
|---|---|---|---|
| 875,294 | 12/1907 | Siabloff | 91/438 |
| 1,605,250 | 11/1926 | Mackenzie | 91/438 |
| 2,069,214 | 2/1937 | Carlson | 91/437 |
| 3,924,705 | 12/1975 | Sugisawa | 91/437 |
| 5,048,630 | 9/1991 | Schaffer | 91/438 |
| 5,727,444 | 3/1998 | Dietrich | 91/437 |

FOREIGN PATENT DOCUMENTS 135210  10/1980  Japan .

*Primary Examiner*—F. Daniel Lopez

[57] ABSTRACT

A power steering cylinder assembly including a cylinder divided by a piston into opposite chambers and a valve controlling flow between a pump, a tank and the chambers. Bypass passages selectively connects the opposite chambers when there is no flow from the pump. The bypass passages includes first and second sets of axial passageways in the wall of the cylinder. Each passageway of the first set of axial passageways having an inlet in the first operating chamber and a first outlet in the exterior of the cylinder. Each passageway of the second set of axial passageways having an inlet in the second operating chamber and a second outlet in the exterior surface of the cylinder. The first and second outlets being in two respective circumferential lines on the exterior surface of the cylinder. A tubular piston has a groove on an inside surface, which is positionable over the first and second outlets of the passageways to allow fluid communication between the two sets of passageways, and movable to prevent communication between the two sets of passageways.

4 Claims, 3 Drawing Sheets

Fig-3-
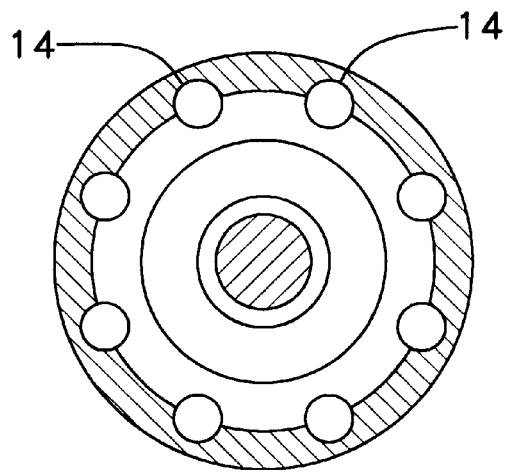
Fig-4-
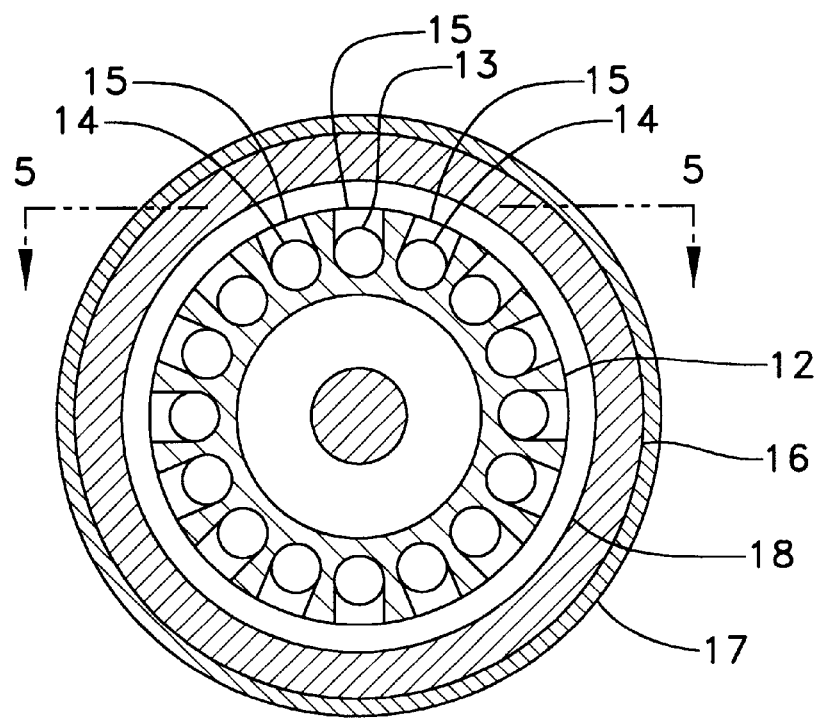

Fig_5_
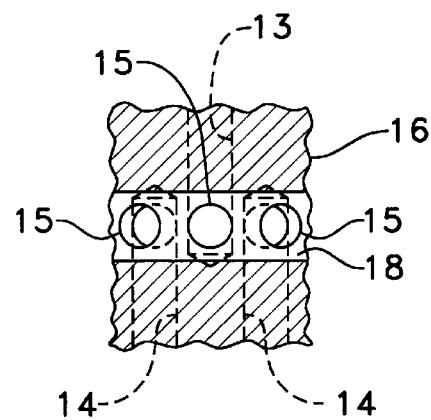
Fig_6_
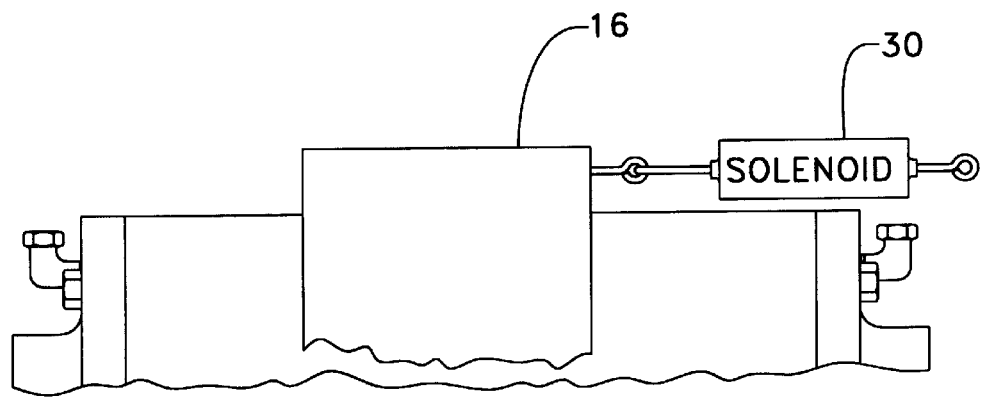

POWER STEERING CYLINDER ASSEMBLY

This application claims the benefit of U.S. Provisional Application No. 60/049,516. Filed on Jun. 13, 1997.

BACKGROUND OF THE INVENTION

This invention relates generally to fluid power assisted steering mechanisms as used in automobiles and like machines, more particularity to freeing or greatly reducing the restrictions imposed by the fluid power system, when manual steering is used.

PRIOR ART

Power steering systems are well known and have been used in automobiles and other wheeled vehicles for many years very successfully. Generally they consist of a hydraulic pump, driven by the engine, a distribution valve controlled by the steering wheel, a reservoir and in many cases a hydraulic cylinder with a piston fastened to a rod that slides through the cylinder. The ends of the rod are connected to steerable wheels. Most of the steering effort is provided by the hydraulic pressure pushing the piston back and forth. The problem with this system is when the operator is driving the machine and a steering pump belt breaks or for some other reason the hydraulic pressure drops. In cold weather it is almost impossible to manually steer the machine. The purpose of the present invention is to reduce the effort needed to manually push the piston in the cylinder to steer the wheels. Applicant has an issued patent on a similar steering cylinder assembly. U.S. Pat. No. 5,727,444 and another patent pending Ser. No. 09/003,007. This present invention is also totally enclosed and operates in a similar manner. It has a slidable tubular piston which functions as a valve.

SUMMARY

This power steering cylinder assembly, which can replace the cylinder in some existing systems, or be used in a new power steering system, is designed to relieve some of the additional load caused by the piston, when manual steering must by used.

BRIEF DESCRIPTION OF DRAWINGS

FIG. 3 is a sectional view taken on line 1—1 of FIG. 1.

FIG. 4 is a sectional view taken on line 2—2 of FIG. 1.

FIG. 5 is a sectional view taken on line 3—3 of FIG. 4.

FIG. 6 is a view showing the electrical solenoid.

DETAILED DESCRIPTION OF DRAWINGS

Figure 1:
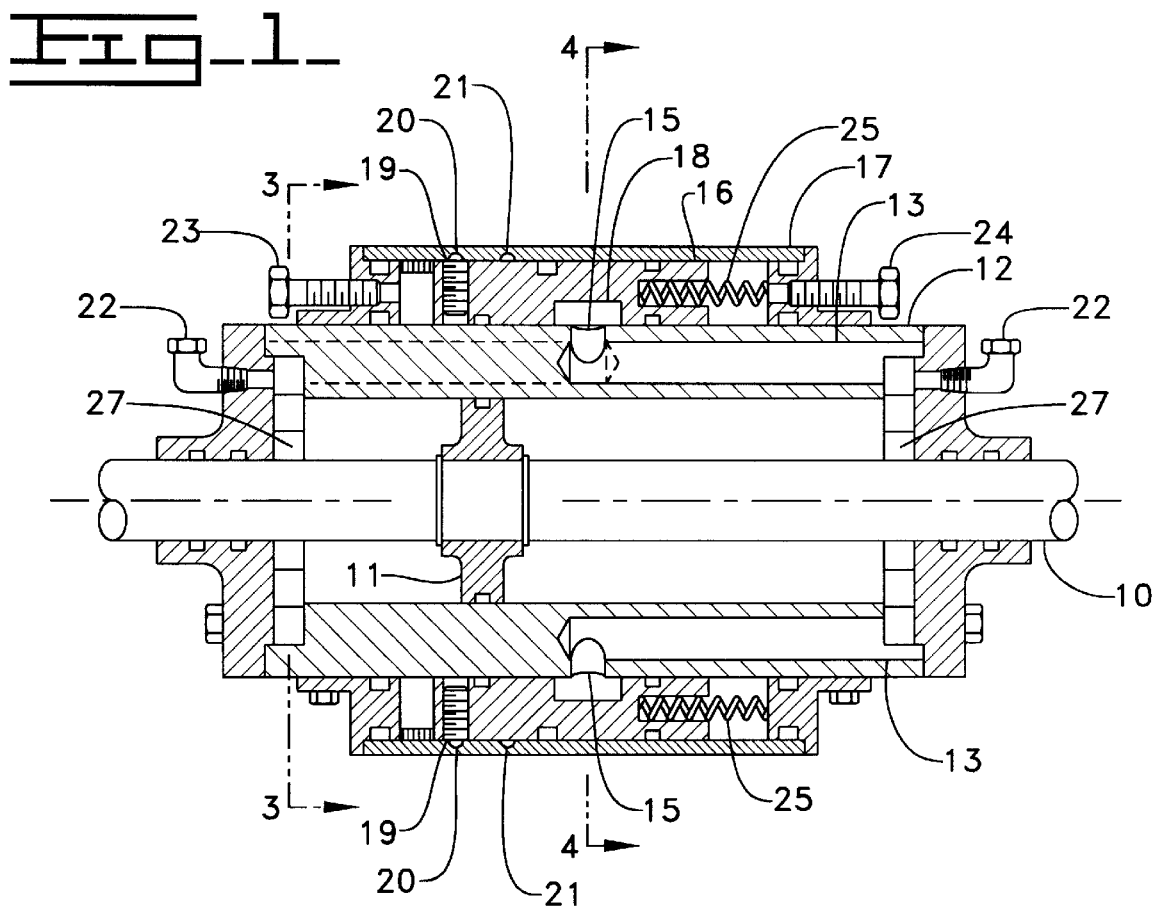
FIG. 1 is a cross section of the cylinder assembly.
Figure 2:
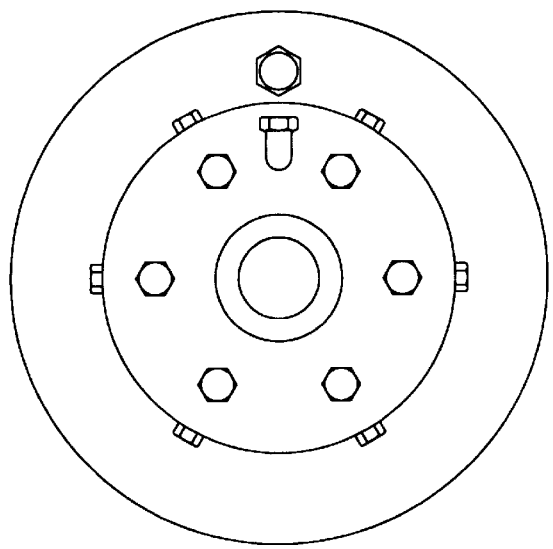
FIG. 2 is an end view of the assembly.

In FIG. 1, the cylinder rod or steering rod is shown as number 10. Number 11 is the piston fastened on rod 10. 12 is the cylinder with the longitudinal holes 13 and 14. These are not through holes, but overlap as shown in FIG. 5. The radial holes 15, shown in FIG. 5 drill into the longitudinal holes 13 and 14. The tubular piston 16 slides on the outer circumference of cylinder 12 and inside diameter of cylinder 17. The piston has an internal groove 18 which opens or covers the radial holes 15. The detent shown at 19, has its plunger in a groove 20, in the cylinder 17. Another groove in cylinder 17 is shown at 21. Number 22 are the ports in each end of cylinder 12, for fluid to enter or be discharged. The opening at 23 connects to the fluid pump and 24 is a vent. The springs 25, constantly urge the tubular piston 16 against the stop 26. 27 shows where the longitudinal holes 13 and 14 open into the cylinder 12. FIG. 5 shows the radial holes 15 as being in the same circumferential line.

OPERATION

When the total system is filled with liquid and the pump is not running, the springs 25 will hold the piston 16 against the stop 26. Manual steering will then push the piston 11 back and forth as the fluid travels from one end of the cylinder to the other end through the holes in the cylinder wall. When the pump is started and builds up enough pressure to overcome the resistance from the detent 19 and the compression springs 25, the tubular piston will move to its stop. The piston then covers the outlet holes 15, to prevent the fluid from flowing through the cylinder wall so power steering can be used.

FIG. 6 shows the second embodiment, wherein the tubular piston (16) is moved by a solenoid 30.

I claim:

1. A power steering cylinder assembly for motor vehicles with power steering systems having a hydraulic pump, the assembly comprising a first cylinder having two end portions and a wall forming an exterior surface and an interior chamber; an internal piston moveable within the internal chamber and dividing the internal chamber into first and second operating chambers; a piston rod fastened to the internal piston and passing through each of the end portions; fluid openings in each of the end portions for allowing fluid to enter or exhaust from the operating chambers to move the piston; fluid passage means in the cylinder for allowing fluid to flow freely between the operating chambers when the hydraulic pump is not running and manual steering is used; with means to open and close the fluid passage means; wherein the fluid passage means comprises first and second sets of axial passageways in the wall of the first cylinder; each passageway of the first set of axial passageways having an inlet in the first operating chamber and a first outlet in the exterior of the cylinder; each passageway of the second set of axial passageways having an inlet in the second operating chamber and a second outlet in the exterior surface of the cylinder; said first and second outlets being in a circumferential line on the exterior surface of the first cylinder; and the means to open and close the fluid passage means allows and prevents communication between the first and second outlets.

2. The power steering cylinder assembly of claim 1, further comprising a second larger diameter cylinder closed at the ends and mounted to and encircling the first cylinder; a floating tubular piston slidable in an area between the exterior surface of the first cylinder and an inside surface of the second cylinder; springs between one of the closed ends of the second cylinder and one end of the tubular piston, said springs urging the tubular piston to a stop on the opposite end; an opening for a vent in the area of the springs; and means for moving the tubular piston against the force of the springs; wherein the means for opening and closing the fluid passage means includes the tubular piston.

3. The power steering cylinder assembly of claim 2, wherein the tubular piston has a groove in an inside surface, said groove selectively positionable over the first and second outlets of the passageways when the springs force the piston to the stop permitting fluid communication between the two sets of passageways; said means for moving the tubular piston against the force of the springs moving the tubular piston, to cover the first and second outlets of the passageways to prevent communication between the two sets of passageways.

4. The power steering cylinder assembly of claim 1, further comprising a floating tubular piston slidable on the exterior surface of the first cylinder, wherein the means for opening and closing the fluid passage means includes the tubular piston, and wherein the tubular piston is moved by a solenoid.

* * * * *